United States Patent [19]
Goeb et al.

[11] Patent Number: 6,107,436
[45] Date of Patent: Aug. 22, 2000

[54] POLYFUNCTIONAL POLYMER

[75] Inventors: Siegfried Rainer Goeb, Willich; Anja Christina Rohmann, Moers, both of Germany

[73] Assignee: 3M Innovative Properties Company, St. Paul, Minn.

[21] Appl. No.: 09/166,637

[22] Filed: Oct. 5, 1998

[51] Int. Cl.[7] .............................. C08L 67/06; C08L 69/00; C08L 71/00; C08L 75/00; C08G 18/32

[52] U.S. Cl. ........................... 528/75; 525/440; 525/445; 525/452; 525/454; 525/455; 525/466; 525/467; 525/468; 528/68; 528/76; 528/80; 528/84; 427/385.5

[58] Field of Search ...................... 528/75, 68, 76, 528/80, 84; 525/440, 445, 452, 454, 455, 466, 467, 468; 427/385.5

[56] References Cited

U.S. PATENT DOCUMENTS

| | | | |
|---|---|---|---|
| 2,897,732 | 8/1959 | Shuger | 94/1.5 |
| 2,897,733 | 8/1959 | Shuger | 94/1.5 |
| 3,326,098 | 6/1967 | Boettler | 94/22 |
| 3,814,776 | 6/1974 | Fischer et al. | 548/314.1 |
| 3,939,126 | 2/1976 | Carder et al. | 528/75 |
| 4,076,671 | 2/1978 | Bright | 523/172 |
| 4,088,633 | 5/1978 | Gurney | 528/99 |
| 4,105,808 | 8/1978 | McKenzie | 427/137 |
| 4,185,132 | 1/1980 | Gurney | 427/137 |
| 4,255,468 | 3/1981 | Olson | 427/137 |
| 4,721,751 | 1/1988 | Schappert et al. | 524/773 |
| 4,758,469 | 7/1988 | Lange | 428/325 |
| 4,906,716 | 3/1990 | Yang et al. | 526/307.2 |
| 5,093,386 | 3/1992 | Bishop et al. | 522/96 |
| 5,126,170 | 6/1992 | Zwiener et al. | 427/385.5 |
| 5,128,432 | 7/1992 | Meixner et al. | 528/49 |
| 5,146,531 | 9/1992 | Shustack | 385/128 |
| 5,236,741 | 8/1993 | Zwiener et al. | 427/385.5 |
| 5,247,048 | 9/1993 | Meixner et al. | 528/49 |
| 5,254,611 | 10/1993 | McDermott | 524/198 |
| 5,290,663 | 3/1994 | Huynh-Tran | 430/284 |
| 5,300,615 | 4/1994 | Meixner et al. | 528/49 |
| 5,328,805 | 7/1994 | Huynh-Tran et al. | 430/284 |
| 5,334,654 | 8/1994 | Starner et al. | 524/849 |
| 5,344,490 | 9/1994 | Roosen et al. | 106/778 |
| 5,412,056 | 5/1995 | Zwiener et al. | 528/73 |
| 5,475,038 | 12/1995 | Skoultchi | 522/96 |
| 5,478,596 | 12/1995 | Gurney | 427/137 |
| 5,516,346 | 5/1996 | Cadien et al. | 51/308 |
| 5,516,873 | 5/1996 | Hicks et al. | 528/60 |
| 5,527,853 | 6/1996 | Landy et al. | 524/521 |
| 5,559,204 | 9/1996 | Squiller et al. | 528/84 |
| 5,561,214 | 10/1996 | Yeske et al. | 528/363 |
| 5,578,693 | 11/1996 | Hagstrom et al. | 528/75 |
| 5,580,945 | 12/1996 | Wade et al. | 528/49 |
| 5,597,930 | 1/1997 | Wicks et al. | 548/314.1 |
| 5,616,630 | 4/1997 | Heinze | 522/96 |
| 5,623,045 | 4/1997 | Zweiner et al. | 528/68 |
| 5,658,672 | 8/1997 | Lenke et al. | 428/423.1 |
| 5,709,908 | 1/1998 | Gurney | 427/137 |
| 5,731,369 | 3/1998 | Mahoney | 523/468 |
| 5,741,872 | 4/1998 | Smith | 526/301 |
| 5,747,551 | 5/1998 | Lewandowski et al. | 522/95 |
| 5,750,191 | 5/1998 | Hachey et al. | 527/163.4 |
| 5,767,220 | 6/1998 | Venham et al. | 528/49 |
| 5,774,265 | 6/1998 | Mathers et al. | 359/539 |
| 5,959,775 | 9/1999 | Joseph et al. | 359/538 |

FOREIGN PATENT DOCUMENTS

| | | |
|---|---|---|
| 2174383 | 12/1996 | Canada . |
| 0 406 921 B1 | 12/1990 | European Pat. Off. . |
| 0 499 326 B1 | 8/1992 | European Pat. Off. . |
| 0 547 462 B1 | 6/1993 | European Pat. Off. . |
| 0 599 461 B1 | 6/1994 | European Pat. Off. . |
| 0 626 430 A1 | 11/1994 | European Pat. Off. . |
| 0 639 628 B1 | 2/1995 | European Pat. Off. . |
| 0 650 988 B1 | 5/1995 | European Pat. Off. . |
| 0 667 362 A1 | 8/1995 | European Pat. Off. . |
| 0 743 333 A1 | 11/1996 | European Pat. Off. . |
| 0 751 191 A2 | 1/1997 | European Pat. Off. . |
| 0 807 648 | 11/1997 | European Pat. Off. . |
| 0 751 191 A3 | 12/1997 | European Pat. Off. . |
| 0 810 203 A1 | 12/1997 | European Pat. Off. . |
| 30 45 587 C2 | 6/1982 | Germany . |
| 40 27 743 A1 | 3/1992 | Germany . |
| 44 15 778 A1 | 11/1995 | Germany . |
| 197 17 427 A1 | 1/1998 | Germany . |
| 197 01 835 | 7/1998 | Germany . |
| 58-65772 | 4/1982 | Japan . |
| 8-48744 | 2/1996 | Japan . |
| 8-259643 | 10/1996 | Japan . |
| WO 96/15179 | 5/1996 | WIPO . |
| WO 96/33241 | 10/1996 | WIPO . |
| WO 97/03814 | 2/1997 | WIPO . |
| WO 97/28470 | 8/1997 | WIPO . |
| WO 97/49746 | 12/1997 | WIPO . |
| WO 98/56842 | 12/1998 | WIPO . |

OTHER PUBLICATIONS

Zwiener et al., "Aspartic acid esters. A new line of reactive diluents for high–solids two–pack polyurethane coatings," STN International, File CAPLUS, CAPLUS Accession No. 1991:561251, Document No. 115: 161251, FATIPEC–Kongr., 20th, pp. 267–270, (1990).

Sax et al.; *Hawley's Condensed Chemical Dictionary, Eleventh Edition*; Van Nostrand Reinhold; New York; 1987; p. 933.

*Primary Examiner*—Rabon Sergent
*Attorney, Agent, or Firm*—Lucy C. Weiss

[57] ABSTRACT

Polyfunctional ethylenically unsaturated polyureas, polythiocarbamateureas, and polyurethaneureas comprise (a) at least one segment derived from an aspartic ester polyamine; and (b) at least one polycarbonate, polyether, or polyester segment. The polyfunctional polymers are useful in preparing curable coatings, films, and articles.

21 Claims, No Drawings

POLYFUNCTIONAL POLYMER

FIELD OF THE INVENTION

This invention relates to polyfunctional ethylenically unsaturated polymers.

BACKGROUND OF THE INVENTION

Civil engineering and industrial coating applications require environmentally safe resin systems that are curable at ambient temperatures to provide polymeric coatings exhibiting good impact and wear resistance, as well as chemical and moisture resistance. Concrete structures, e.g., require coatings that exhibit such properties even where shrinkage-induced cracks occur in the underlying structure. Acrylate-based coating compositions have provided a balance of stability and fast cure (even at low temperatures) but have required the use of significant quantities of low molecular weight monomers that have sometimes presented an inhalation risk and an environmental hazard.

Acrylate-based compositions have also been widely used in the radiation curing industry, where significant quantities of low molecular weight monomers have been added to a polyfunctional polymer or oligomer in order to effect viscosity reduction. This has often resulted in an impairment of the peformance of the resultant radiation cured coatings, as the desirable properties of the base polymer or oligomer have tended to be diminished by the effect of the monomer.

Thus, there exists a continuing need in the art for polyfunctional polymers or oligomers that exhibit improved viscosities and that can be cured alone or in combination with only small amounts of low molecular weight monomer(s) to provide durable, impact-resistant polymer coatings.

SUMMARY OF THE INVENTION

Briefly, in one aspect, this invention provides polyfunctional ethylenically unsaturated polyureas, polythiocarbamateureas, and polyurethaneureas comprising (a) at least one segment derived from an aspartic ester polyamine; and (b) at least one polycarbonate, polyether, or polyester segment. Preferably, the polyfunctional polymer is a polyfunctional polyurea or polyurethaneurea (more preferably, a polyurethaneurea) that preferably comprises at least one polycarbonate or polyester segment.

The polyfunctional polymers of the invention exhibit unexpectedly reduced viscosities and are thus particularly useful in preparing radiation curable coatings and films. The polymers can be cured alone or in combination with small amounts of ethylenically unsaturated monomer(s) to provide durably bondable coatings. Such compositions cure in a reasonable amount of time at any of a wide range of commonly-encountered temperatures and, due to the reduced monomer content, provide reduced inhalation risk and environmental hazard. In addition, the resulting coatings, films, and articles surprisingly exhibit good cold flexibility, good toughness, and good wear resistance.

If desired, the polyfunctional polymers of the invention can also be used in combination with larger quantities of ethylenically unsaturated monomer(s), where they can function as property modifiers or crosslinkers. For example, the polymers are useful in pavement marking compositions as impact modifiers.

In other aspects, this invention also provides an article comprising the cured polyfunctional polymer of the invention and a process for preparing a coating.

DETAILED DESCRIPTION OF THE INVENTION

The polyfunctional polymers of the invention can be prepared by the reaction of at least one polyisocyanate; at least one hydroxyl-, thio-, or secondary amino-polyfunctional polycarbonate, polyether, or polyester; at least one isocyanate-reactive, aspartic ester polyamine chain extender; and at least one ethylenically unsaturated monomer having additional functionality, e.g., hydroxyl or amine, that is reactive with isocyanate.

Useful polyisocyanates include aliphatic, alicyclic, and aromatic diisocyanates, and mixtures thereof. A number of such diisocyanates are commercially available. Representative examples of suitable diisocyanates include hexamethylene diisocyanate (HDI), trimethyl hexamethylene diisocyanate (TMHDI), m- and p-tetramethylxylene diisocyanate (TMXDI), diphenylmethane diisocyanate (MDI), napthalene diisocyanate (NDI), phenylene diisocyanate, isophorone diisocyanate (IPDI), toluene diisocyanate (TDI), bis(4-isocyanatocyclohexyl) methane ($H_{12}$MDI), and the like, and mixtures thereof. Useful polyisocyanates also include derivatives of the above-listed monomeric polyisocyanates. These derivatives include, but are not limited to, polyisocyanates containing biuret groups, such as the biuret adduct of hexamethylene diisocyanate (HDI) available from Bayer Corp., Pittsburgh, Pa. under the trade designation Desmodur® N-100, polyisocyanates containing isocyanurate groups, such as that available from Bayer Corp., Pittsburgh, Pa. under the trade designation Desmodur® N-3300, as well as polyisocyanates containing urethane groups, uretdione groups, carbodiimide groups, allophonate groups, and the like. If desired, small amounts of one or more polyisocyanates having three or more isocyanate groups can be added to effect a degree of crosslinking. Preferred polyisocyanates include aliphatic diisocyanates and derivatives thereof, with IPDI being most preferred.

Useful polycarbonates, polyethers, and polyesters include those which have an equivalent weight in the range of about 250 to about 5000 (preferably from about 400 to about 2,500, more preferably from about 500 to about 1,500) and which have an average secondary amino-, thio-, and/or hydroxyl-functionality of about 2.0 to about 3.0 (preferably of about 2.0 to about 2.8, more preferably of about 2.0 to about 2.5). A number of such functional polymers are commercially available. Diols are preferred due to their availability, low cost, and stability. Representative examples of polymers that are useful (when functionalized in the foregoing manner) include aliphatic polycarbonates such as polyestercarbonates and polyethercarbonates; polyethers such as polyethylene glycol, polypropylene glycol, polybutylene glycol, and polytetrahydrofuran; polyesters such as polycaprolactones, polybutylene adipate, polydiethylene adipate, poly(3-methyl-1,5-pentane) adipate, and poly (neopentyl/1,6-hexane) adipate; and mixtures thereof. Polycarbonates and polyesters are preferred because of their excellent UV-, heat-, and oxidation stability, with polycarbonates being most preferred because of their excellent hydrolysis resistance.

Useful chain extenders include the low molecular weight (e.g., below about 1000, preferably below about 600) secondary amine reaction products of maleic acid esters and polyamines, i.e., low molecular weight aspartic ester polyamines, and mixtures thereof. Although difunctional chain extenders are generally preferred, small amounts of one or more chain extenders having three or more isocyanate-reactive functional groups can be added, if desired. Small amounts of conventional low molecular weight, isocyanate-reactive chain extenders (e.g., polyols such as ethylene glycol, 1,2- and 1,3-propanediol, 1,3- and 1,4- and 2,3-butanediol, diethylene glycol, dipropylene glycol, tripropylene glycol, 1,6-hexanediol, 1,4-cyclohexane dimethanol, 3-methyl 1,5-pentanediol, neopentyl glycol, and the like; secondary polyamines such as 1,3-di(4-piperidyl)propane (DIPIP), N(2-aminoethyl propylmethyldimethoxysilane (DAS), piperazine, N,N'-dialkyl(methylene)dianiline, N,N'-dialkyl(1,4-diamino)benzene, N,N'-bis(diisopropylmethyl)diaminoethane, N,N'-bis(t-butyl) diamino cyclohexane), and the like; and mixtures thereof) can also be added.

Preferred aspartic ester polyamine chain extenders for use in preparing the polyfunctional polymers of the invention are those that can be represented by the following formula:

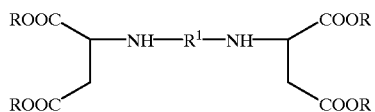

wherein $R^1$ is a divalent organic group (preferably having from 1 to about 40 carbon atoms) and each R is independently an organic group inert toward isocyanate groups at temperatures of 100° C. or less.

In the above formula, preferably $R^1$ is an aliphatic group (preferably having from 1 to about 40 carbon atoms), which can be branched, unbranched, or cyclic, and more preferably, $R^1$ is selected from the group of divalent hydrocarbon groups obtained by the removal of the amine groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane, or 3,3-dimethyl-4,4'-diamino-dicyclohexyl methane. Divalent hydrocarbon groups obtained by the removal of the amine groups from relatively high molecular weight polyether polyamines containing aliphatically-bound primary amine groups, such as the products marketed under the trade designations Jeffamine® (by Texaco and Huntsman) and Hycar® (by B. F. Goodrich), are also suitable. Other suitable polyamine precursors include ethylene diamine, 1,2-diaminopropane, 1,6-diaminohexane, 2,5-diamino-2,5-dimethylhexane, 1,11-diaminoundecane, 1,12-diaminododecane, 2,4-and/or 2,6-hexahydrotoluylene diamine, and 2,4'--diamino-dicyclohexyl methane. Aromatic polyamines such as 2,4-and/or 2,6-diaminotoluene and 2,4'-and/or 4,4'-diaminodiphenyl methane are also suitable but less preferred, due to their lower reactivity and tendency to yellow.

In the above formula, preferably, each R is independently an organic group having from 1 to about 40 carbon atoms, more preferably each R is independently an alkyl group (preferably having from 1 to about 20 carbons), which may be branched or unbranched, and most preferably each R is independently a lower alkyl group (having from 1 to about 4 carbon atoms).

Suitable aspartic ester polyamines are commercially available from Bayer (Pittsburgh, Pa., USA or Leverkusen, Germany) under the trade designations Desmophen® XP-7053, XP-7059, VP-LS 2973, and XP-7109, for example. Desmophen® XP-7053 is substantially composed of the following compound, N,N'-(4,4'-dicyclohexylmethane-diyl) bis tetraethyl aspartic ester:

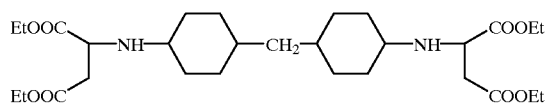

Desmophen® XP-7059 is substantially composed of the following compound, N,N'-(hexane-1,6-diyl) bis tetraethyl aspartic ester:

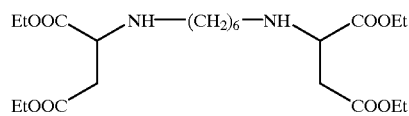

Desmophen® XP-7109 is substantially composed of the following compound, N,N'-(2-methylpentane-1,5-diyl) tetrabutyl aspartic ester:

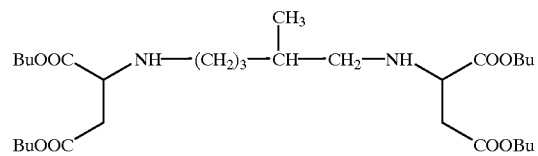

Desmophen® VP-LS 2973 (preferred) is substantially composed of the following compound, N,N'-(3,3-dimethyldicyclohexylmethane-4,4'-diyl)-bis-tetraethyl aspartic ester:

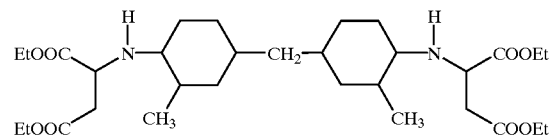

Other suitable aspartic ester polyamines include, e.g., N,N'-(bis-2-propyl)polypropyleneglycol 300-O,O'-diyl-bis-tetraethyl aspartic ester, N,N'-(butyl-1,4-diyl)-bis-tetraethyl aspartic ester, N,N'-(2,2-dimethylpropane-1,3-diyl)-bis-tetraethyl aspartic ester, N,N'-(2,4-dimethylhexane-1,6-diyl)-bis-tetraethyl aspartic ester, and the like, and mixtures thereof.

Suitable ethylenically unsaturated monomers for use in preparing the polyfunctional polymer are those which further comprise isocyanate-reactive functionality, e.g., hydroxyl or amine functionality. Representative examples of suitable monomers include 2-hydroxyethyl methacrylate, 3-hydroxypropyl methacrylate, 2-hydroxyethyl acrylate, 3-hydroxypropyl acrylate, 4-hydroxybutyl acrylate, 4-hydroxybutyl methacrylate, allyl alcohol, allylethyl alcohol, oleyl alcohol, 4-vinylbenzyl alcohol, and the like, and mixtures thereof. Preferred ethylenically unsaturated monomers are (meth)acryloyl functional. Most preferred is 2-hydroxyethyl methacrylate.

The polyfunctional polymer can be prepared by first combining at least one hydroxyl-, thio-, or secondary amino-polyfunctional polycarbonate, polyether, or polyester (about 0.1 to about 2.5 moles) with at least one isocyanate (about 2.0 to about 3.0 moles), optionally in the presence of a solvent. If its use is desired, the ethylenically unsaturated monomer described infra can be present at this stage to function as a solvent. The resulting mixture can be allowed to react for about 1 hour at about 40–60° C. under a dry, inert gas atmosphere, generally with stirring. About 0.01% of an organometallic catalyst, e.g., of tin or bismuth, can be utilized, as further explained below. Chain extender(s) (about 0.1 to about 1.5 moles) can then be added to the mixture. However, the chain extender can be part of the initial mixture (of polymer and isocyanate) described above, if desired. The reaction can be allowed to continue for a period of about 3 hours until the isocyanate content is near the theoretical value. Finally, the isocyanate-reactive ethylenically unsaturated monomer(s) can be added (about 0.2 to about 5.6 moles) and reaction continued for a period of about 2 hours to provide polyfunctional polymer.

Preferably, a catalyst is used in preparing the polyfunctional polymer. Catalysts for reacting isocyanates and active hydrogen-containing compounds are well known in the art. Preferred catalysts include organometallic compounds and amines. Useful organometallic compounds include organotin compounds such as dimethyltin dilaurate, dibutyltin dilaurate, dibutyltin dimercaptide, bis lauryl(dibutyltin) oxide, and the like, and mixtures thereof. Zinc or bismuth compounds are also useful. Amine catalysts include tertiary amines, such as, for example, diazobicyclooctane. A preferred catalyst is dibutyltin dilaurate. Catalyst is used in an amount effective to provide a desired reaction rate. Preferably, catalyst is used in an amount of about 0.01–2 percent by weight (more preferably, 0.01–0.03 weight percent), based on the total weight of solids.

Water can accelerate the reaction of aspartic ester amines with isocyanates. Free water may be present in the system or adsorbed on the polyfunctional polycarbonate, polyether, or polyester reactant or on any added pigments or fillers.

If desirable for a particular application, the polyfunctional polymer can be combined with reactive diluent, i.e., with at least one ethylenically unsaturated monomer. Suitable monomers are those which are capable of reacting with the polyfunctional polymer. Preferred monomers are (meth) acryloyl-functional monomers, more preferably (meth) acryloyl-functional monomers having a molecular weight of at least about 150 and/or a vapor pressure of less than about 43 mbar at 20° C. (most preferably less than about 10 mbar at 20° C.).

Representative examples of suitable monomers include methyl acrylate, ethyl acrylate, n-butyl acrylate, isobutyl acrylate, t-butyl acrylate, ethyl methacrylate, butyl methacrylate, ethyltriglycol methacrylate, isobornyl acrylate, 2-(((butylamino)carbonyl)oxy)ethyl acrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, 2-ethylhexyl acrylate, n-octyl acrylic acetate, decyl acrylate, lauryl acrylate, stearyl acrylate, 2-hydroxyethyl acrylate, 2-hydroxypropyl acrylate, 2-hydroxyethyl methacrylate, 2-hydroxypropyl methacrylate, β-ethoxyethyl acrylate, 2-cyanoethyl acrylate, cyclohexyl acrylate, diethyl aminoethyl acrylate, hexyl methacrylate, decyl methacrylate, lauryl methacrylate, stearyl methacrylate, phenylcarbitol acrylate, nonylphenyl carbitol acrylate, nonylphenoxy propyl acrylate, N-vinyl pyrrolidone, polycaprolactam acrylate, acryloyloxyethyl phthalate, acryloyloxy succinate, 2-ethylhexyl carbitol acrylate, ω-carboxy-polycaprolactam monoacrylate, phthalic acid monohydroxyethyl acrylate, styrene, vinyl acetate, vinyl toluene, α-methyl styrene, acrylonitrile, gycidyl methacrylate, n-methylol acrylamide-butyl ether, n-methylol acrylamide, acrylamide, dicyclopentenyloxyethyl acrylate, dicyclopentenyl acrylate, dicyclopentenyloxyethyl acrylate, and the like, and mixtures thereof.

Preferred monomers include ethyl acrylate, n-butyl acrylate, isobutyl acrylate, t-butyl acrylate, methyl methacrylate, ethyl methacrylate, butyl methacrylate, ethyltriglycol methacrylate, isobornyl acrylate, 2-(((butylamino)carbonyl)oxy)ethyl acrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, 2-ethylhexyl acrylate, and mixtures thereof, with isobornyl acrylate, 2-(((butylamino)carbonyl)oxy)ethyl acrylate, ethyltriglycol methacrylate, 2-ethylhexyl acrylate, 2-ethylhexyl methacrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, and mixtures thereof being more preferred.

If desired, small amounts of multifunctional ethylenically unsaturated monomer(s) (compounds possessing at least two polymerizable double bonds in one molecule, e.g., multifunctional acrylates or methacrylates) can be added to, e.g., effect crosslinking. Representative examples of such multifunctional monomers include ethylene glycol diacrylate; 1,2-propylene glycol diacrylate; 1,3-butylene glycol diacrylate; 1,6-hexanediol diacrylate; noepentylglycol diacrylate; trimethylolpropane triacrylate; polyoxyalkylene glycol diacrylates such as dipropylene glycol diacrylate, triethylene glycol diacrylates, tetraethylene glycol diacrylates, polyethylene glycol diacrylate; ethylene glycol dimethacrylate; 1,2-propylene glycol dimethacrylate; 1,3-butylene glycol dimethacrylate; 1,6-hexanediol dimethacrylate; neopentylglycol dimethacrylate; bisphenol-A-dimethacrylate; diurethane dimethacrylate; trimethylolpropane trimethacrylate; polyoxyalkylene glycol dimethacrylates such as dipropylene glycol dimethacrylate, triethylene glycol dimethacrylates, tetraethylene glycol dimethacrylates, polyethylene glycol dimethacrylate; N,N-methylene-bis-methacrylamide; diallyl phthalate; triallyl phthalate; triallyl cyanurate; triallyl isocyanurate; allyl acrylate; allyl methacrylate; diallyl fumarate; diallyl isophthalate; diallyl tetrabromophthalate, and the like, and mixtures thereof.

The polyfunctional polymer (or a mixture of the polymer and ethylenically unsaturated monomer(s)) can be coated (to form thin films or coatings) or can be molded (to form articles), and can be cured (preferably under an inert gas atmosphere or using methods that reduce oxygen inhibition) by exposure to ultraviolet or electron beam radiation. Photoinitiators, e.g., benzophenone can be added, if necessary or desired, e.g., in amounts ranging from about 0.05 to about 5 weight percent. Representative examples of suitable photoinitiators include 2,2-dimethoxy-1,2-diphenylethane-1-one, 1-hydroxy-cyclohexyl-phenylketone, 2-methyl-1-[4-(methylthio)phenyl]-2-morpholinopropanone-1, 1-hydroxy-cyclohexyl-phenylketone, benzophenone, and the like, and mixtures thereof.

Alternatively, a curing system comprising a thermal polymerization initiator and, preferably, an accelerator can be utilized (e.g., in amounts of from about 0.01 to about 5' weight percent of each). Useful initiators include organic peroxides, e.g., diacyl peroxides, dialkyl peroxides, hydroperoxides, ketone peroxides, and the like, and mixtures thereof. The accelerator of the curing system, if an accelerator is used, functions to decompose the initiator through a redox reaction and thereby facilitates the generation of active radicals. (Alternatively, heat and pressure can be utilized to accelerate reaction.) Useful accelerators include metal salts, e.g., cobalt naphthenate and vanadium octoate; tertiary amines; mercaptanes, e.g., dimethyl-p-toluidine, diisopropoxy-p-toluidine, diethyl-p-toluidine, dimethyl aniline, and glycol dimercaptoacetate; and the like; and mixtures thereof.

Objects and advantages of this invention are further illustrated by the following examples, but the particular materials and amounts thereof recited in these examples, as well as other conditions and details, should not be construed to unduly limit this invention.

EXAMPLES

In the following Examples, all parts are by weight unless otherwise specified.

Test Methods

Shore D Hardness

For Examples 1–7 and Comparative Examples 1–4: A 10 g sample of polyfunctional polymer was poured into an aluminum weighing pan and irradiated with a high intensity ultraviolet (UV) light source (intensity of 110 mJ/cm$^2$, UV H-bulb equipment available from Eltosch GmbH, Hamburg, Germany). Shore D hardness was measured according to DIN (Deutsches Institut für Normung) Method 53 505 using a shore hardness tester manufactured by Hahn & Kolb GmbH, Stuttgart, Germany).

For Compositions A–H and Comparative Compositions A–C: A 10 g sample of a mixture of polyfunctional polymer, ethylenically-unsaturated monomer, initiator, and accelerator was poured into an aluminum weighing pan and allowed to cure for at least 24 hours at 23° C. Cylindrical samples of cured resin having a diameter of about 5 cm and a thickness of at least 5 mm resulted. Shore D hardness was measured according to DIN 53 505.

E-Modulus, Tensile Strength at Break, and Elongation at Break

For Examples 1–7 and Comparative Examples 1–4: A 200 g sample of polyfunctional polymer was knife coated between two siliconized polyester films to give a thickness of about 200 microns. The resulting thin coat of polymer was then irradiated between the two liners using a high intensity UV light source (intensity of 110 mJ/cm$^2$, UV H-bulb equipment available from Eltosch GmbH, Hamburg, Germany). E-modulus, tensile strength, and elongation were then measured using a tensile tester according to DIN 53 455.

For Compositions A–H and Comparative Compositions A–C: A 200 g sample of a mixture of polyfunctional polymer, ethylenically-unsaturated monomer, initiator, and accelerator was knife coated between two siliconized polyester films to give a thickness of about 200 microns. The resulting thin coating was allowed to cure between the two liners at 23° C. for at least 24 hours. E-modulus, tensile strength, and elongation were then measured using a tensile tester according to DIN 53 455.

Cold Impact Resistance

Sample preparation: Cured film samples having a thickness of approximately 200 microns were prepared essentially as described above for the measurement of E-modulus, tensile strength, and elongation. The resulting film samples were adhered to an aluminum panel (15 cm×5 cm) using Adhesive Transfer Tape 9457 (available from 3M Company, St. Paul, Minn., USA). The aluminum panel was placed in a freezer at a temperature of −20° C. for 12 hours.

Test: The panel was removed from the freezer, and a cold impact test was performed according to ASTM (American Society for Testing and Materials) Method D-1709/75. The highest impact energy that failed to damage the surface of the film sample was recorded in Joules.

Abrasion

Sample preparation: Cured films having a thickness of about 200 microns were prepared essentially as described above for the measurement of E-modulus, tensile strength, and elongation. A 10 cm×10 cm sample was then cut from each film.

Test: An abrasion wheel H22 was employed according to the method DIN 53754 at a rate of 70 revolutions per minute for 500 revolutions (10 minutes). Each sample was weighed before and after abrasion. Before weighing after abrasion, the surface of each sample was cleaned with a soft brush to remove any abraded portion of the sample. The test procedure was repeated four times, and the results were averaged and normalized to 2000 revolutions. The results are reported in grams of sample lost per 2000 revolutions.

Preparation of Aspartic Ester Polyamines

Preparation of Aspartic Ester Polyamine 1 (AEP 1)

Maleic acid diethylester (2.0 moles, 344 g) was placed in a 1 liter, four-necked flask equipped with a thermometer, a mechanical stirrer, an inert gas inlet, a reflux condenser, and a dropping funnel. O,O'-Bis-(2-aminopropyl)-polypropyleneglycol 300 (1.0 mole, 400 g, available as Jeffamine® D-400 from Huntsman Corp. Europe, Zaventem, Belgium) was added dropwise starting at a temperature of 20° C. The reaction temperature was not allowed to exceed 50° C. and was held at 50° C. for 48 hours.

Preparation of Aspartic Ester Polyamines 2–5 (AEP 2–5)

Three other aspartic ester polyamines (AEP 2–4) were prepared in essentially the same manner as for AEP 1 by allowing maleic acid diethyl ester to react with the diamines shown in Table 1. AEP 5 (which can be prepared by the same method) was purchased from Bayer, Leverkusen, Germany in the form of Desmophen® VP LS 2973.

TABLE 1

Aspartic Ester Polyamines

| Aspartic Ester Polyamine | | Diamine Used to Prepare Aspartic Ester Polyamine | NH Equiv. Weight of Diamine |
|---|---|---|---|
| AEP 1 | N,N'-(bis-2-propyl)polypropylene-glycol 300-O,O'-diyl)-bis-tetraethyl aspartic ester | O,O'-bis-(2-aminopropyl)-polypropylene glycol 300 | 416 |
| AEP 2 | N,N'-(butyl-1,4-diyl)-bis-tetraethyl aspartic ester | 1,4-butyldiamine | 209 |
| AEP 3 | N,N'-(2,2-dimethyl-propane-1,3-diyl)-bis-tetraethyl aspartic ester | 1,3-diamino-2,2-dimethyl propane | 225.7 |
| AEP 4 | N,N'-(2,4-dimethyl-hexane-1,6-diyl)-bis-tetraethyl aspartic ester | 1,6-diamino-2,4-dimethyl hexane | 243.6 |
| AEP 5 | N,N'-(3,3-dimethyldicyclohexyl-methane-4,4'-diyl)-bis-tetraethyl aspartic ester | 4,4'-diamino-3,3'-dimethyl dicyclohexyl methane | 291 |

Example 1

5.0 moles (1110 g) of isophorone diisocyanate (IPDI, NCO equivalent weight of 111) was placed in a 5 liter, four-necked flask equipped with a thermometer, a mechanical stirrer, an inert gas inlet, and a reflux condenser. Then 2.0 OH equivalents (2,126 g) of polycarbonatediol (OH equivalent weight of 1063, available as Desmophen® C 200 from Bayer, Leverkusen) was added to the flask in three portions, so as not to exceed a reaction temperature of 60° C. Two NH equivalents (418 g, 1 mole) of N,N'-(butyl-1,4-diyl)-bis-tetraethyl aspartic ester (AEP 2 in Table 1 above) were then added slowly in four portions, and the resulting mixture was held at 50° C. for 2 hours. The mixture was allowed to cool to 23° C., and the isocyanate concentration of the mixture was measured by titration according to DIN 53 185. A calculated equimolar amount (with 10% excess) of 2-hydroxyethylmethacrylate (HEMA), corresponding to 6.6 moles (858 g) was added using a dropping funnel. The resulting mixture was then maintained at 50° C. for 8 hours. The residual NCO in the resulting methacryloyl-polyfunctional polyurethaneurea product was measured (using the di-(n-butylamine) titration method according to DIN 53 185) and found to be less than 0.1%. The product was placed in glass bottles for storage.

2,2-dimethoxy-1,2-diphenylethane-1-one was added to the product (0.5 parts by weight based on 100 parts of product, Irgacure® 651 UV photoinitiator available from Ciba-Geigy, Lautertal, Germany), and the resulting mixture was stirred well. The mixture was then cured using a high intensity UV light source (UV H-bulb equipment available from Eltosch GmbH, Hamburg, Germany) emitting radiation at wavelengths of 220–440 nm and having an intensity of 110 mJ/cm$^2$. Films or thick samples of the cured mixture (polymer components summarized in Table 2) were prepared and tested, as described above under Test Methods, and the results are shown in Table 3 below.

Example 2

Example 1 was essentially repeated, with the exception that 451.4 g (2 NH equivalents, 1 mole) of N,N'-(2,2-dimethyl propane-1,3-diyl)-bis-tetraethyl aspartic ester (AEP 3 in Table 1 above) was used as the chain extender.

Example 3

Example 1 was essentially repeated, with the exception that 832 g (2 NH equivalents) of N,N'-(bis-2-propyl) polypropyleneglycol 300-O,O'-diyl)-bis-tetraethyl aspartic ester (AEP 1 in Table 1) was used as the chain extender.

Example 4

Example 1 was essentially repeated, with the exception that the chain extender employed was N,N'-(2,4-dimethyl hexane-1,6-diyl)-bis-tetraethyl aspartic ester (243.6 g, AEP 4 in Table 1).

Example 5

Example 1 was essentially repeated, with the exception that the chain extender employed was N,N'-(3,3-dimethyldicyclohexylmethane-4,4'-diyl)-bis-tetraethyl aspartic ester (291 g, AEP 5 in Table 1 above).

Example 6

5.0 moles (916.6 g) of 2,4-toluene diisocyanate (2,4-TDI, NCO equivalent weight of 91.7) was placed in a 5 liter, four-necked flask equipped with a thermometer, a mechanical stirrer, an inert gas inlet, and a reflux condenser. Polycaprolactone diol (2.0 OH equivalents, 1000 g, available as CAPA® 214 from Solvay, Warrington, GB) was added to the flask in three portions, so as not to exceed a reaction temperature of 60° C. N,N'-(3,3-dimethyldicyclohexylmethane-4,4'-diyl)-bis-tetraethyl aspartic ester (291 g, 2 NH equivalents, AEP 5 in Table 1) was then added slowly in 4 portions, and the resulting mixture was held at 50° C. After two hours, the isocyanate concentration of the mixture was measured by titration according to DIN 53 185. A calculated equilmolar amount (with 10% excess, corresponding to 6.6 moles, 858 g) of 2-hydroxyethylmethacrylate (HEMA) was added using a dropping funnel. The resulting mixture was then maintained at 50° C. for 8 hours. The residual NCO content of the resulting methacryloyl-polyfunctional polyurethaneurea product was measured and found to be less than 0.1%. The product was placed in glass bottles for storage.

2,2-dimethoxy-1,2-diphenylethane-1-one was added to the product (0.5 parts by weight based on 100 parts of product, Irgacure® 651 UV photoinitiator available from Ciba-Geigy, Lautertal, Germany), and the resulting mixture was stirred well. The mixture was then cured using a high intensity UV light source (UV H-bulb equipment available from Eltosch GmbH, Hamburg, Germany) emitting radiation at wavelengths of 220–440 nm and having an intensity of 110 mJ/cm$^2$. Films or thick samples of the cured mixture (polymer components summarized in Table 2) were prepared and tested, as described above under Test Methods, and the results are shown in Table 3 below.

Example 7

5.0 moles (1110 g) of isophorone diisocyanate (IPDI, NCO equivalent weight of 111) was placed in a 5 liter, four-necked flask equipped with a thermometer, a mechanical stirrer, an inert gas inlet, and a reflux condenser. Then 2.0 OH equivalents (2000 g, OH equivalent weight of 1000) of polytetraethylene glycol (available as Therathane® 2000, from Du Pont, Bad Homburg, Germany) was added to the flask in three portions, so as not to exceed a reaction temperature of 60° C. N,N'-(3,3-dimethyldicyclohexylmethane-4,4'-diyl)-bis-tetraethyl aspartic ester (291 g, 2 NH equivalents, AEP 5 in Table 1) was then added slowly in four portions, and the resulting mixture was held at 50° C.

After two hours, the isocyanate concentration of the mixture was measured by titration according to DIN 53 185. A calculated equilmolar amount (with 10% excess, corresponding to 6.6 moles, 858 g) of 2-hydroxyethylmethacrylate (HEMA) was added using a dropping funnel. The resulting mixture was then maintained at 50° C. for 8 hours. The residual NCO in the resulting methacryloyl-polyfunctional polyurethaneurea product was measured and found to be less than 0.1%. The product was placed in glass bottles for storage.

2,2-dimethoxy-1,2-diphenylethane-1-one was added to the product (0.5 parts by weight based on 100 parts of product, Irgacure® 651 UV photoinitiator available from Ciba-Geigy, Lautertal, Germany), and the resulting mixture was stirred well. The mixture was then cured using a high intensity UV light source (UV H-bulb equipment available from Eltosch GmbH, Hamburg, Germany) emitting radiation at wavelengths of 220–440 nm and having an intensity of 110 mJ/cm$^2$. Films or thick samples of the cured mixture (polymer components summarized in Table 2) were prepared and tested, as described above under Test Methods, and the results are shown in Table 3 below.

Comparative Example 1

Example 1 was essentially repeated, with the exception that no chain extender was used.

Comparative Example 2

Example 1 was essentially repeated, with the exception that the aspartic ester diamine chain extender was replaced with 1 mole (90 g) of butanediol.

Comparative Example 3

Example 1 was essentially repeated, with the exception that the aspartic ester diamine chain extender was replaced with 1 mole (104 g) of 2,2-dimethyl-1,3-propanediol.

Comparative Example 4

Example 1 was essentially repeated, with the exception that the aspartic ester diamine chain extender was replaced by 1 mole (400 g) of polypropylene glycol 400.

TABLE 2

Polyfunctional Polymers

| Example No. | Diol | Isocyanate | Chain Extender | Monomer | Viscosity (kPa · s) |
|---|---|---|---|---|---|
| 1 | Polycarbonate | IPDI | AEP 2 | HEMA | 7 |
| 2 | Polycarbonate | IPDI | AEP 3 | HEMA | 7.5 |
| 3 | Polycarbonate | IPDI | AEP 1 | HEMA | 6 |
| 4 | Polycarbonate | IPDI | AEP 4 | HEMA | 5.5 |
| 5 | Polycarbonate | IPDI | AEP 5 | HEMA | 6 |
| 6 | Polyester | TDI | AEP 5 | HEMA | 8 |
| 7 | Polyether | IPDI | AEP 5 | HEMA | 9 |
| C1 | Polycarbonate | IPDI | — | HEMA | 95 |
| C2 | Polycarbonate | IPDI | Butanediol | HEMA | 50 |
| C3 | Polycarbonate | IPDI | Neopentane diol | HEMA | 70 |
| C4 | Polycarbonate | IPDI | Polypropylene glycol 400 | HEMA | 80 | polycarbonate = polycarbonate diol (Desmophen ™ C 200, from Bayer, Leverkusen, Germany)
polyester = caprolactone diol (available as CAPA ™ 214 from Solvay Interox Ltd, Warrington, GB)
polyether = polytetraethylene glycol diol (Therathane ™ 2000, from Du Pont, Bad Homburg, Germany)
IPDI = isophorone diisocyanate
TDI = toluene diisocyanate
HEMA = 2-hydroxyethylmethacrylate

TABLE 3

Properties of UV-Cured Polyfunctional

| Ex. No. | Cold Impact esistance (J) | Abrasion (mg/2000 cycles) | Shore D Hardness | Stress at Yield Point (MPa) | Elongation at Break (%) | E-Modulus (MPa) |
|---|---|---|---|---|---|---|
| 1 | >21 | 31 | 56 | 13.4 | 51 | 301 |
| 2 | >21 | 20 | 51 | 10.0 | 56 | 201 |
| 3 | >21 | 14 | 47 | 6.7 | 60 | 147 |
| 4 | >21 | 19 | 53 | 11.2 | 64 | 186 |
| 5 | >21 | 25 | 56 | 9.0 | 34 | 155 |
| 6 | 16 | 76 | 71 | 19 | 28 | 345 |
| 7 | >21 | 31 | 45 | 7.4 | 86 | 176 |
| C1 | >16 | 121 | 31 | 0.9 | 54 | 108 |
| C2 | 16 | 96 | 60 | 15 | 101 | 245 |
| C3 | 16 | 102 | 60 | 12 | 51 | 265 |
| C4 | 16 | 87 | 55 | 10 | 59.5 | 163 |

Polymer/Monomer Compositions

The above-described polyfunctional polymers of the Examples were combined with ethylenically unsaturated monomers and the resulting polymer/monomer mixtures cured and tested, as described below:

Compositions A–D

The uncured polyfunctional polymer of Example 5 was combined with the monomers shown in Table 4 below, and the resulting mixture was stirred until a homogeneous mixture was obtained. Benzoyl peroxide (available as Cadox® from Akzo Chemicals) was added to mixture in the amount of 2 parts by weight, along with 0.5 parts of N,N-dimethyl-p-toluidine, and the resulting mixture was stirred until the additives were dissolved. The mixture was knife coated between two siliconized polyester films and allowed to polymerize at a temperature of 23° C. for 15 minutes. The cured compositions were then tested, and the results are shown in Table 5 below.

Compositions E–G

The uncured polyfunctional polymer of Example 6 was combined with the monomers shown in Table 4 below, and the resulting mixture was stirred until a homogeneous mixture was obtained. Benzoyl peroxide (available as Cadox® from Akzo Chemicals) was added to the mixture in the amount of 2 parts by weight, along with 0.5 parts of N,N-dimethyl-p-toluidine, and the resulting mixture was stirred until the additives were dissolved. The mixture was knife coated between two siliconized polyester films and allowed to polymerize at a temperature of 23° C. for 15 minutes. The cured compositions were then tested, and the results are shown in Table 5 below.

Composition H

The uncured polyfunctional polymer of Example 7 was combined with the monomers shown in Table 4 below, and the resulting mixture was stirred until a homogeneous mixture was obtained. Benzoyl peroxide (available as Cadox® from Akzo Chemicals) was added to the mixture in the amount of 2 parts by weight, along with 0.5 parts of N,N-dimethyl-p-toluidine, and the resulting mixture was stirred until the additives were dissolved. The mixture was knife coated between two siliconized polyester films and allowed to polymerize at a temperature of 23° C. for 15 minutes. The cured compositions were then tested, and the results are shown in Table 5 below.

Comparative Composition A

Methyl methacrylate monomer was polymerized by free-radical polymerization using essentially the procedure used for Compositions A–D (except including partial polymerization to obtain a coatable viscosity).

Comparative Composition B

A mixture of methyl methacrylate (MMA) and 2-ethyl hexyl acrylate (2-EHA) in a weight ratio of 2:1 was polymerized using essentially the method used for Comparative Composition A.

Comparative Composition C

The polyfunctional polymer of Comparative Example 2 (40 weight percent) was combined with methyl methacrylate (MMA) (60 weight percent) and polymerized using essentially the method used for Compositions A–D.

TABLE 4

Polymer/Monomer Compositions

| Composition No. | Example No. of Polymer | Amount of Polymer (weight percent) | Monomer 1 | Amount of Monomer 1 (weight percent) | Monomer 2 | Amount of Monomer 2 (weight percent) |
|---|---|---|---|---|---|---|
| A | 5 | 40 | MMA | 40 | 2-EHA | 20 |
| B | 5 | 40 | AAEM | 40 | EGMA | 20 |
| C | 5 | 40 | AAEM | 40 | IBA | 20 |
| D | 5 | 40 | MMA | 60 | 0 | 0 |
| E | 6 | 40 | AAEM | 60 | 0 | 0 |

TABLE 4-continued

Polymer/Monomer Compositions

| Composition No. | Example No. of Polymer | Amount of Polymer (weight percent) | Monomer 1 | Amount of Monomer 1 (weight percent) | Monomer 2 | Amount of Monomer 2 (weight percent) |
| --- | --- | --- | --- | --- | --- | --- |
| E | 6 | 40 | MMA | 40 | 2-EHA | 20 |
| G | 6 | 40 | MMA | 60 | 0 | 0 |
| H | 7 | 40 | MMA | 40 | 2-EHA | 20 |
| CA | None | None | MMA | 100 | 0 | 0 |
| CB | None | None | MMA | 66 | 2-EHA | 34 |
| CC | C2 | 40 | MMA | 60 | 0 | 0 |

TABLE 5

Properties of Thermally-Cured Polymer/Monomer Compositions

| Composition No. | Cold Impact Resistance (J) | Abrasion (mg/2000 cycles) | Shore D hardness | Stress at Yield Point (MPa) | Elongation at Break (%) | E-Modulus (MPa) |
| --- | --- | --- | --- | --- | --- | --- |
| A | >21 | 21 | 12 | 13.6 | 106 | 206 |
| B | >21 | 18 | 22 | 1.3 | 73 | 5 |
| C | >21 | 35 | 15 | 1.4 | 83 | 10 |
| D | 16 | 72 | 62 | — | 28 | 521 |
| E | 16 | 56 | 47 | 3.0 | 46 | 20 |
| F | 16 | 36 | 70 | 27.0 | 41 | 563 |
| G | 16 | 98 | 86 | — | 19.5 | 824 |
| H | >21 | 34 | 10 | 2.1 | 121 | 189 |
| CA | <2 | 423 | 89 | — | 5.2 | 2840 |
| CB | 4 | 386 | 77 | — | 10.9 | 685 |
| CC | 8 | 196 | 52 | 17.0 | 21 | 387 |

Various modifications and alterations of this invention will become apparent to those skilled in the art without departing from the scope and spirit of this invention.

What is claimed is:

1. A polyfunctional ethylenically unsaturated polymer selected from the group consisting of polyfunctional ethylenically unsaturated polyureas, polythiocarbamateureas, and polyurethaneureas comprising (a) at least one segment derived from an aspartic ester polyamine; (b) at least one segment derived from an isocyanate reactive ethylenically unsaturated monomer; and (c) at least one polycarbonate, polyether, or polyester segment, different from (a) or (b).

2. The polymer of claim 1 wherein said polyfunctional ethylenically unsaturated polymer is a polyfunctional ethylenically unsaturated polyurea or polyurethaneurea.

3. The polymer of claim 1 wherein said polyfunctional ethylenically unsaturated polymer comprises at least one polycarbonate or polyester segment.

4. The polymer of claim 1 wherein said aspartic ester polyamine is represented by the following formula:

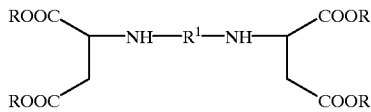

wherein $R^1$ is a divalent organic group that has from 1 to 40 carbon atoms and each R is independently an organic group that has from 1 to 40 carbon atoms and that is inert toward isocyanate groups at temperatures of 100° C. or less.

5. The polymer of claim 4 wherein said $R^1$ is a branched, unbranched, or cyclic aliphatic group and each said R is independently a branched or unbranched alkyl group having from 1 to 20 carbons.

6. The polymer of claim 5 wherein each said R is independently a lower alkyl group having from 1 to 4 carbon atoms.

7. The polymer of claim 1 wherein said aspartic ester polyamine is selected from the group consisting of N,N'-(4,4'-dicyclohexylmethane-diyl) bis tetraethyl aspartic ester, N,N'-(hexane-1,6-diyl) bis tetraethyl aspartic ester, N,N'-(2-methylpentane-1,5-diyl) tetrabutyl aspartic ester, N,N'-(3,3-dimethyldicyclohexylmethane-4,4'-diyl)-bis-tetraethyl aspartic ester, N,N'-(bis-2-propyl)polypropyleneglycol 300-O,O'-diyl-bis-tetraethyl aspartic ester, N,N'-(butyl-1,4-diyl)-bis-tetraethyl aspartic ester, N,N'-(2,2-dimethylpropane-1,3-diyl)-bis-tetraethyl aspartic ester, N,N'-(2,4-dimethylhexane-1,6-diyl)-bis-tetraethyl aspartic ester, and mixtures thereof.

8. A (meth)acryloyl-polyfunctional polyurethaneurea comprising (a) at least one segment derived from an aspartic ester diamine; and (b) at least one polycarbonate segment.

9. A polyfunctional ethylenically unsaturated polymer comprising the reaction product of (a) at least one polyisocyanate; (b) at least one hydroxyl-, thio-, or secondary amino-polyfunctional polycarbonate, polyether, or polyester, different from (c) or (d); (c) at least one isocyanate-reactive, aspartic ester polyamine chain extender; and (d) at least one ethylenically unsaturated monomer having additional functionality that is reactive with isocyanate.

10. The polymer of claim 9 wherein component (b) is hydroxyl- or secondary amino-polyfunctional.

11. The polymer of claim 9 wherein component (b) is a polycarbonate or polyester.

12. The polymer of claim 9 wherein said aspartic ester polyamine chain extender is represented by the following formula:

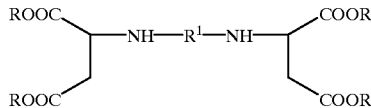

wherein $R^1$ is a divalent organic group that has from 1 to 40 carbon atoms and each R is independently an organic group that has from 1 to 40 carbon atoms and that is inert toward isocyanate groups at temperatures of 100° C. or less.

13. The polymer of claim 12 wherein said $R^1$ is a branched, unbranched, or cyclic aliphatic group and each said R is independently a branched or unbranched alkyl group having from 1 to 20 carbons.

14. The polymer of claim 13 wherein each said R is independently a lower alkyl group having from 1 to 4 carbon atoms.

15. The polymer of claim 9 wherein said aspartic ester polyamine is selected from the group consisting of N,N'-(4,4'-dicyclohexylmethane-diyl) bis tetraethyl aspartic ester, N,N'-(hexane-1,6-diyl) bis tetraethyl aspartic ester, N,N'-(2-methylpentane-1,5-diyl) tetrabutyl aspartic ester, N,N'-(3,3-dimethyldicyclohexylmethane-4,4'-diyl)-bis-tetraethyl aspartic ester, N,N'-(bis-2-propyl)polypropyleneglycol 300-O,O'-diyl-bis-tetraethyl aspartic ester, N,N'-(butyl-1,4-diyl)-bis-tetraethyl aspartic ester, N,N'-(2,2-dimethylpropane-1,3-diyl)-bis-tetraethyl aspartic ester, N,N'-(2,4-dimethylhexane-1,6-diyl)-bis-tetraethyl aspartic ester, and mixtures thereof.

16. A (meth)acryloyl-polyfunctional polymer comprising the reaction product of (a) at least one polyisocyanate; (b) at least one hydroxyl-polyfunctional polycarbonate; (c) at least one isocyanate-reactive, aspartic ester diamine chain extender; and (d) at least one (meth)acryloyl-functional monomer having additional functionality that is reactive with isocyanate.

17. An article comprising the cured polymer of claim 1.
18. An article comprising the cured polymer of claim 8.
19. An article comprising the cured polymer of claim 9.
20. An article comprising the cured polymer of claim 16.
21. A process for preparing a coating comprising the step of applying to a substrate a coating composition consisting essentially of at least one polymer of claim 1.

* * * * *

UNITED STATES PATENT AND TRADEMARK OFFICE
CERTIFICATE OF CORRECTION

PATENT NO. : 6,107,436
DATED : August 22, 2000
INVENTOR(S) : Siegfried R. Goeb and Anja C. Rohmann It is certified that error appears in the above-identified patent and that said Letters Patent is hereby corrected as shown below:

Title page,
FOREIGN PATENTS "0 406 921 B1", should read -- 0 403 921 B1 --.

Signed and Sealed this

Fourth Day of December, 2001

Attest:

NICHOLAS P. GODICI
Attesting Officer   Acting Director of the United States Patent and Trademark Office